L. K. STEPHENS.
VEHICLE WHEEL.
APPLICATION FILED FEB. 20, 1911.

1,023,598.

Patented Apr. 16, 1912.

*Fig. 3.*  *Fig. 2.*

WITNESSES:
W. F. Ferris.
W. S. Castle.

INVENTOR
L. K. Stephens.
BY
ATTORNEY

UNITED STATES PATENT OFFICE.

LOUIS K. STEPHENS, OF DALLAS, TEXAS.

VEHICLE-WHEEL.

1,023,598. Specification of Letters Patent. Patented Apr. 16, 1912.

Application filed February 20, 1911. Serial No. 609,644.

*To all whom it may concern:*

Be it known that I, LOUIS K. STEPHENS, citizen of the United States, residing at Dallas, in the county of Dallas and State of Texas, have invented certain new and useful Improvements in Vehicle-Wheels, of which the following is a specification.

This invention pertains to vehicle wheels and particularly to resilient vehicle wheels.

The object of the invention is to provide a vehicle wheel having a hub member rotatable on an axle with a plurality of flat springs extending therefrom in involute curves and a spoke receiving member surrounding and attached to the free ends of the springs, in combination with a plurality of coöperating lugs, some of which project from one member into the path of the others projecting from the other member; whereby the springs are prevented from winding upon the hub member or spreading except to a limited degree, thus providing under all conditions a resilient connection between the members.

A still further object of the invention is to provide a device of the character described that will be strong, durable, efficient and simple and comparatively inexpensive to produce, also one in which the several parts will not be likely to get out of working order.

Figure 1:
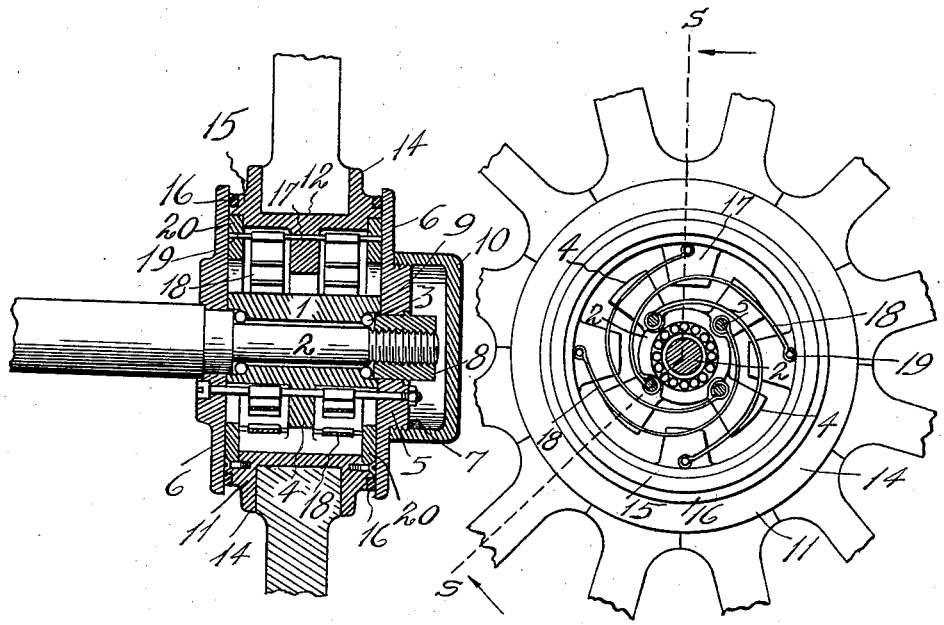
Figure 1:
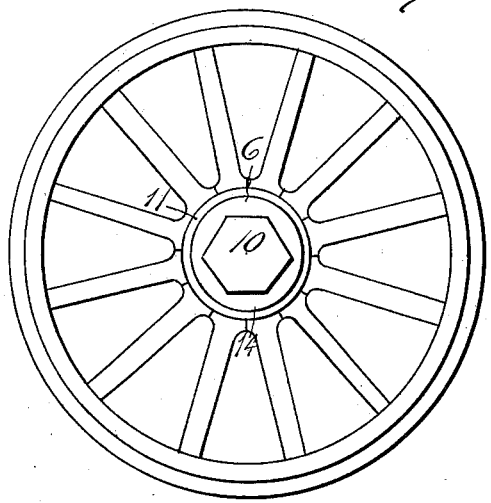

With the above and other objects in view the invention has relation to certain novel features of construction and operation, an example of which is described in the following specification and illustrated in the accompanying drawings, wherein:

Figure 1 is a side elevation of a vehicle wheel embodying the invention, Fig. 2 is a detail of the hub portion in elevation, the closure plate retaining ring being omitted, and Fig. 3 is a vertical sectional view taken on the line s—s of Fig. 2.

In the drawings the numeral 1 designates a hub sleeve or member adapted to rotate on an axle 2. At each end the sleeve has provision for receiving ball bearings 3. From the central portion of the sleeve lugs 4 radiate. These lugs are preferably integral with the sleeve and are spaced apart. Bolts 5 extend longitudinally of the sleeve and may be partially embedded in the surface thereof. I prefer to pass these bolts through the lugs. At each end of the sleeve a circular closure plate 6 is disposed and fastened to the sleeve by the bolts 5 and nuts 7 placed on the ends of the latter.

A nut 8 is screw-threaded on the outer end of the axle 2 and the adjacent plate is arranged to revolve about said nut. This plate has a screw-threaded boss 9 and a cap 10 engaged with said boss covers and conceals the nut 8 and the nuts 7. It is apparent that the sleeve and plates are united or connected in fixed relation to each other. A spoke receiving member 11 surrounds the sleeve between the plates and has a peripheral groove 12 in which wooden spokes may be disposed. At each side of the groove an annular flange 14 is provided. The wooden spokes may be fastened between these flanges or wire spokes (not shown) may be secured to the flanges. It is preferable to have the closure plates 6 extend beyond annular bosses 15 on the member 11 and provide each boss with an annular recess in which a suitable packing ring 16 is confined so as to bear against the inner face of the adjacent closure plate and exclude the entrance of foreign matter between the plates.

The member 11 has an internal diameter considerably greater than the diameter of the sleeve so as to provide an annular space therebetween and into which space the lugs 4 project. From the inner periphery of the member lugs 17 project inwardly between the lugs 4 and are also spaced apart. Normally the outer ends of the lugs terminate some distance from the surface toward which they project but are at all times in the path of each other, circumferentially of the sleeve and member. On each side of the lugs flat springs 18 are arranged, there being two sets of said springs. The inner ends of the springs are secured to the bolts 5 and thus attached to the sleeve; while the outer ends are secured about pins 19 passing through the lugs 17 and terminating within the member 11. These pins have their outer ends seating in retaining rings 20 set into the member 11 so as not to interfere with the closure plates. The springs extend from the sleeve in involute curves and the lugs serve to prevent the springs winding or unwinding too far when the wheel revolves in either direction. The springs are sufficiently strong to normally support the member 11 in concentric relation to the sleeve when the wheel is carrying its maximum load and to yield when a cushioning action is desired. With the parts in their normal position the lugs will be equally spaced apart as shown in Fig. 2. The adjacent faces of the lugs are cut on such angles to lie substantially parallel when in contact and also to permit one lug to slide along the other radially when the springs yield or expand.

It is apparent that when the wheel is revolved in either direction the lugs will contact, but when the rim or tire encounters an obstruction or is subjected to a shock some of the lugs will be thrown apart and the shock absorbed by the springs. This is true because the member 11 will be thrown into eccentric relation with the sleeve 1 and one of the lugs 17 will have a fulcrum point on one of the lugs 4, the other lugs being thrown out of contact.

What I claim, is:

1. In a resilient vehicle wheel, a sleeve arranged to fit on an axle; flat springs extending from the sleeve in involute curves; lugs projecting from the sleeve; a spoke receiving member surrounding the sleeve, the springs and the lugs; lugs extending inwardly from the spoke receiving member into the path of the first named lugs; circular plates disposed on each side of the sleeve and member; fastening devices passing through the plates and lugs of the sleeve in close proximity to the sleeve; and attaching devices extending through the lugs of the member and connected with the outer ends of the springs.

2. In a resilient vehicle wheel, a sleeve adapted to fit on an axle, a spoke receiving member surrounding the sleeve, rings embedded in the member at each side, circular closure plates abutting the ends of the sleeve and having sliding contact with the rings and the member, radial lugs projecting from the sleeve, inwardly directed lugs projecting from the member between the first named lugs, bolts passing through the plates and radial lugs adjacent the sleeve and uniting the closure plates and sleeve in fixed relation, fastening rods passing through the rings and the inwardly directed lugs adjacent the spoke receiving member, and involute springs mounted between the sleeve and member on each side of the lugs and having their inner ends attached to the bolts and their outer ends secured to the fastening rods.

In testimony whereof I have signed my name to this specification in the presence of two subscribing witnesses.

LOUIS K. STEPHENS.

Witnesses:
JACK A. SCHLEY,
Z. M. DUCKWORTH.

---

Copies of this patent may be obtained for five cents each, by addressing the "Commissioner of Patents, Washington, D. C."